United States Patent [19]

Brost et al.

[11] 4,379,655
[45] Apr. 12, 1983

[54] PROCESS AND APPARATUS FOR LAYING A SUBTERRANEAN FILM

[75] Inventors: Robert L. Brost, Independence, Kans.; Duane W. Gagle, Bartlesville, Okla.

[73] Assignee: Phillips Petroleum Company, Bartlesville, Okla.

[21] Appl. No.: 202,098

[22] Filed: Oct. 30, 1980

[51] Int. Cl.³ .................... E02F 5/10; F16L 1/02
[52] U.S. Cl. ............................. 405/176; 405/183
[58] Field of Search ............ 405/174, 176, 177, 179, 405/180, 183; 47/9; 111/1, 7

[56] References Cited

U.S. PATENT DOCUMENTS

| | | | |
|---|---|---|---|
| 2,078,872 | 4/1937 | Pfeiffer | 47/9 |
| 2,843,068 | 7/1958 | Smith et al. | 405/176 X |
| 3,065,605 | 11/1962 | Zitko | 405/176 |
| 3,083,542 | 4/1963 | Summers et al. | 405/180 X |
| 3,327,484 | 6/1967 | Launder et al. | 405/176 X |
| 3,339,369 | 9/1967 | Ryan | 405/176 X |
| 3,590,588 | 7/1971 | Draper et al. | 61/72.6 |
| 4,098,089 | 7/1978 | Zaslavsky et al. | 61/72.6 |

FOREIGN PATENT DOCUMENTS

| | | | |
|---|---|---|---|
| 657132 | 4/1979 | U.S.S.R. | 405/176 |
| 649777 | 5/1979 | U.S.S.R. | 405/176 |

*Primary Examiner*—David H. Corbin

[57] ABSTRACT

Improved method and means for laying a strip of film beneath the surface of the soil can include any one or more of the following: (1) method and means for starting the film; (2) method and means for centering the film in a film inlet of a plow; (4) method and means for guiding the film in a feed housing of a plow; (5) method and means for centering the film in a film distribution housing of a plow; and/or (6) method and means for supporting the film while earth is being laid down thereon.

22 Claims, 6 Drawing Figures

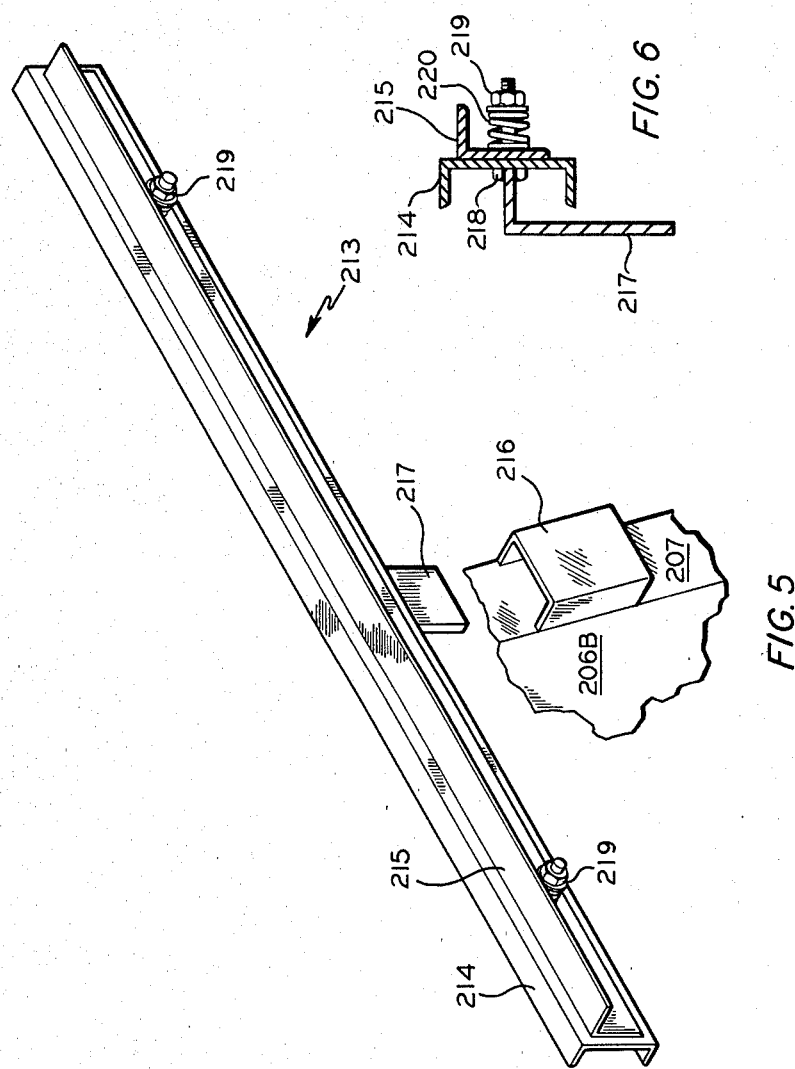

PROCESS AND APPARATUS FOR LAYING A SUBTERRANEAN FILM

FIELD OF THE INVENTION

The invention relates to hydraulic and earth engineering. In one aspect the invention relates to improvements over the prior U.S. Pat. No. 3,590,888 of July 6, 1971 to Draper and Gagle.

DESCRIPTION OF THE PRIOR ART

U.S. Pat. No. 3,590,888 of July 6, 1971 to Draper and Gagle is a basic patent in the technology of laying subterranean films. U.S. Pat. No. 3,590,888 is incorporated by reference for purposes of indicating the background of the present invention and illustrating the state of the art.

The process and apparatus described in U.S. Pat. 3,590,888 adequately fulfill the objects of that invention. However, various advancements in the art of film laying are desirable.

One desired advancement is in the area of starting the film into the ground. As disclosed in U.S. 3,590,888, one end of the film must be anchored to or in the ground before starting to lay film. Accordingly, method and means eliminating difficulties associated with this step are desirable.

Another desired advancement is that of preventing so far as practicable entry of loosened soil into the film spreading portion or film distributing housing of the subterranean plow of U.S. 3,590,588.

Another desired advancement is that of preventing irregularities such as, for example, longitudinal wrinkles and the like, from forming in the film as it leaves the plow as a result of rocks or clods of soil on the surface prepared by the plow for laying the film or as a result of uneven distribution of soil being laid down on the film. Such rocks or clods of soil or uneven distribution of soil on the film can deform the film even as it is being laid.

Another desired advancement is that of insuring that the film is spread in the desired configuration, so far as practicable, in a preferred embodiment, flat and horizontal throughout the central portion of the film surface but curled upward at the edges of the film to form a shallow trough in cross-section to retain a reservoir of moisture.

Another desired advancement is that of insuring that the film is fed smoothly and evenly within the plow prior to laying the film. Stated in another way, the desired advancement is to avoid variations in pressure, terrain, and the like to which the film is subjected after leaving the plow from significantly influencing the film feed mechanism of the plow.

Accordingly, an object of the invention is process and apparatus for laying subterranean film which achieves the above described desired advancements in the art of laying film under the surface of the ground, individually or in combination, and which are well adapted for their intended purposes. Other objects and advantages of the invention will be clear to the artisan from the following description of the invention and the drawings.

SUMMARY OF THE INVENTION

According to the invention there is provided apparatus for laying a strip of film under the ground. Thus according to the invention there is provided apparatus for laying a strip of film under the surface of the ground comprising a hollow plow having a film inlet above the ground surface and a film outlet adapted to be below the ground surface when the plow is moving through the ground, a source of film, means for passing film from the source of film into the film inlet, through the hollow plow, and out of the film outlet under the soil surface while the plow is moving through the soil, and first means adjacent the film outlet of the hollow plow for supporting the film while laying down earth thereon.

Further according to the invention there is provided apparatus for laying a strip of film under the surface of the ground comprising a hollow plow having a film inlet above the ground surface and a film outlet adapted to be below the ground surface as the plow is moving through the ground, a source of film, means for passing film from the source of film into the film inlet, through the hollow plow, and out of the film outlet, said means comprising centering means for centering the film in the film inlet and for preventing side-to-side movement of the film as the film enters the hollow plow.

Further according to the invention there is provided apparatus for laying a strip of film under the surface of the ground comprising a plow having a film inlet, a film feed housing in film feed communication with the film inlet, a film distribution housing in film feed communication with the film feed housing, said film distribution housing further having a film outlet, first means connected in film feed communication with the film feed housing for centering the film edge to edge and for smoothing in lateral directions the film being centered, second means for shaping the film to be laid according to a desired conformation and for stretching the film in lateral directions, said second means being in film feed communication with the first means.

Further according to the invention there is provided apparatus for laying a strip of film under the surface of the ground comprising a source of folded film, said film having a first portion, a second portion, and a fold joining the first portion and the second portion, a plow having a film inlet, a film feed housing in film feed communication with the film inlet, a film distribution housing in film feed communication with the film feed housing, said film distribution housing further having a film outlet, means in the film feed housing for spreading the first portion from the second portion of the folded film, means in the film feed housing for guiding the fold of the spread film and for preventing side-to-side movement of the film in the film feed housing, means in the film distribution housing for further spreading the first portion from the second portion of the folded film to produce a generally horizontally disposed strip of non-folded film, and means for passing the generally horizontally disposed strip of film through the film outlet of the film distribution housing.

Further according to the invention there is provided apparatus for laying a strip of film under the surface of the ground comprising a plow having a film inlet above the ground surface and a film outlet below the ground surface when the plow is moving through the ground, and film starting means associated with the plow for releasably retaining an end of film as the plow enters into the ground and for releasing the end of film after a portion of the strip of film is laid under the surface of the ground.

Further according to the invention there is provided apparatus for laying a generally horizontally disposed strip of film under the surface of the ground comprising a spool of folded film, said folded film having a first portion, a second portion joined to and overlapping the first portion, and a fold at the junction of the first portion and the second portion, a hollow plow comprising a film feed housing having a film inlet, a film distribution housing in film feed communication with the film feed housing, the film feed distribution housing having a film outlet, first means adjacent the film inlet for centering a strip of folded film passed from the spool to prevent side-to-side movement of the film, second means adjacent the first means for spreading the first portion from the second portion of the folded film, third means adjacent the second means for guiding the fold of the spread film to prevent side-to-side movement of the film, fourth means for passing the guided film into the film distribution housing, fifth means for further spreading the first portion from the second portion of the film to produce a generally horizontally disposed nonfolded strip of film, sixth means for centering the thus spread film to prevent edge-to-edge movement of the film and for smoothing the film in lateral directions, seventh means for curving the lateral edges of the centered film and for stretching the thus centered film laterally, eighth means for preventing the curved lateral edges of the film from overlapping noncurved portions of the film, and ninth means adjacent the film outlet for placing earth on the film with curved lateral edges so that wrinkling of the film is prevented and so that entry of earth into the film feed housing is reduced.

According to the invention there is also provided method for laying a strip of film under the ground. Thus according to the invention there is provided a method of laying a strip of film under the surface of the ground comprising passing the film through a hollow plow supporting the film under the surface of the ground, laying down earth on the supported film, and laying the film with earth laid down thereon on an underground surface.

Further according to the invention there is provided a method for laying a strip of film under the ground comprising centering a strip of film to prevent side-to-side movement of the film in a film inlet of a hollow plow, said hollow plow having a film inlet above the surface of the ground and a film outlet adapted to be below the surface of the ground while the plow is moving through the ground passing the strip of film from the film inlet to the film outlet and through the film outlet, and laying the thus passed film under the ground.

Further according to the invention there is provided method for laying a strip of film under the surface of the ground comprising passing film from above ground to below ground through a hollow plow, centering the passing film to prevent edge-to-edge movement of the film in the plow and smoothing the film in lateral directions, shaping the centered film in a desired conformation and stretching the centered film in lateral directions, and laying the thus passed film under the surface of the ground.

Further according to the invention there is provided method for laying a strip of film under the surface of the ground comprising passing a strip of folded film from above ground to below ground, the folded film having a first portion, a second portion overlapping the first portion, and a fold, joining the first portion and the second portion, spreading the first portion from the second portion of the folded film, guiding the fold of the spread film so that side-to-side movement of the film is prevented, further spreading the first portion from the second portion of the guided film to produce a generally horizontally disposed strip of nonfolded film, and laying the horizontally disposed strip of nonfolded film under the surface of the ground.

Further according to the invention there is provided method for laying a strip of film under the surface of the ground comprising passing a strip of film from above ground to below ground through a hollow plow moving into and through the ground, releasably retaining an end of the strip of film as the plow moves into the ground, and releasing the end of film after a portion of the strip of film is laid under the surface of the ground.

Further according to the invention there is provided a method of laying a generally horizontally disposed strip of film under the surface of the ground comprising in combination unrolling a folded film from a spool of folded film having a first portion, a second portion joined to and overlapping the first portion, and a fold at the junction of the first and second portion, centering the unrolled folded film to prevent side-to-side movement of the film in a film inlet of a film feed housing of a hollow plow comprising a film feed housing and a film distribution housing in film feed communication with the film feed housing, spreading the first portion from the second portion, guiding the fold of the spread film to prevent side-to-side movement of the film, passing the guided film from the film feed housing into the film distribution housing, further spreading the first portion from the second portion of the film to produce a generally horizontally disposed nonfolded strip of film, centering the thus further spread film, curving the lateral edges of the thus centered film and stretching the thus centered film laterally, preventing the curved lateral edges of the curved film from overlapping noncurved portions of the film, passing the film with curved lateral edges from the film feed housing, and laying down earth on the film so that wrinkling of the film is prevented and so that entry of earth into the film feed housing is substantially prevented.

BRIEF DESCRIPTION OF THE DRAWINGS

FIGS. 5 and 6 illustrate in more particularity the structure of a film starting means according to the invention.

DETAILED DESCRIPTION OF THE DRAWINGS

Figures 1, 2:
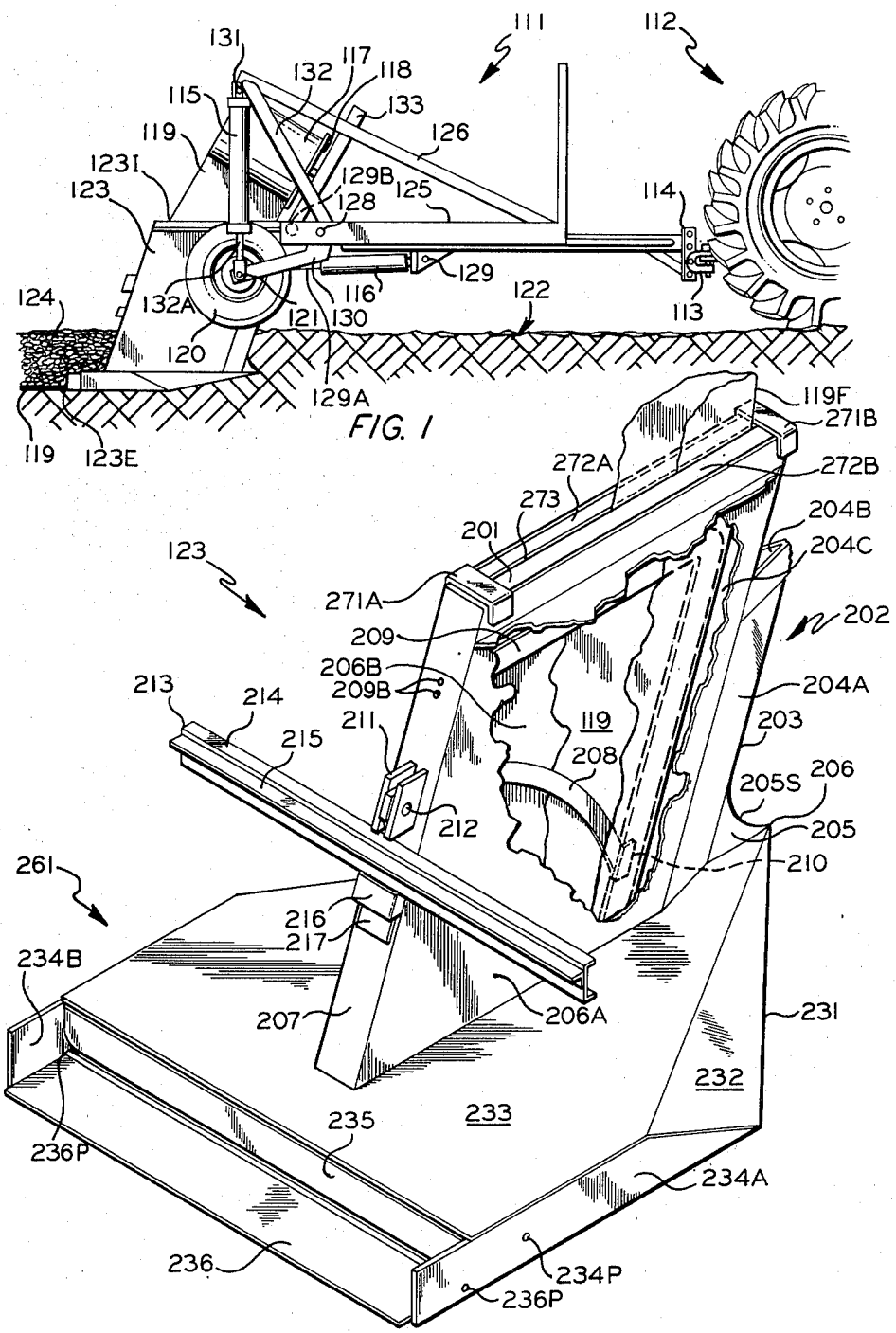
FIG. 1 is an elevational view, with the earth in cross section, of apparatus according to the invention, being drawn and laying a horizontal ribbon of film under the ground.
FIG. 2 illustrates in perspective a portion of the apparatus of FIG. 1 having portions thereof schematically broken away to show structure.

In FIG. 1, a hollow plow 123 having an adjustable hitch plate 114 is being drawn through the ground from left to right by a tractor having wheel 112 and hitch 113. Details of preferred embodiments of the plow 123 will be given below in discussion of FIGS. 2-4.

The plow 123 is pivotably mounted on frame 125 of trailer 111 at pivot 128. Hydraulic ram 116 is pivotably mounted to frame 125 at pivot 129 and has extensible arm 129A pivotably mounted to plow 123. Hydraulic cylinder 116 is thus functional for canting the plow 123 relative to frame 125 to determine the angle at which plow 123 enters earth and travels through earth after entry. Wheels 120 are also pivotably mounted at pivot 128 to frame 125 via support brace 130. Hydraulic cylinder 115 is pivotably supported at pivot 131 connected by braces 126 and 132 to frame 125 and has extensible arm 132A pivotably mounted at 121 to support brace 130 which is pivotably mounted at 128 to frame 125. Hydraulic cylinder 115 is thus functional for raising and lowering the wheels 120 relative to frame 125 and for determining the maximum depth of plow 123. As plow 123 is drawn through the earth beneath the surface 122 thereof it lays behind it a generally horizontal strip of film 119 underground under soil 124 which film 119 comes from a preformed roll of film 117 supported on spool 118 which is rotatably mounted on support 133 which is pivotably mounted at pivot 129B to pivot simultaneously in constant spaced apart relationship to plow 123. As the plow 123 is drawn through the ground 124 the film inlet 123I is above the ground while the film outlet or exit 123E is below the ground laying the film 119 under the soil 124.

The strip of film 119 may be made of many substances. Preferably they are strips of plastic, made generally by melting pellets of the plastic and extruding the melted plastic as plastic film strips. The plastic may be polyethylene of any process, polypropylene, or other polyolefin polymers or copolymers suitable for films, polyvinyl chloride, terpolymers, for example, ethylene-propylene copolymers of the rubbery type, or saran, or other synthetic films which are substantially impervious to passage of water. The plastic strips can be coated with other coatings, for example, thin metal foil, herbicides, insecticides, nematocides, fertilizers, and the like. The strip can also be coated with asphalt, asphalt emulsion, or other substantially impervious coatings and in these examples the strip may be any fabric, preferably felt, glass fibers, glass wool, burlap, or polyethylene or other synthetic fabric. All the above strips can be from 0.003 to 0.2 inch thick, preferably from 0.004 to 0.0625 inch thick. Metal foil by itself in the thinner ranges, employing metals such as aluminum or copper, from 0.001 to 0.02 inch thick, may also be used as these underground strips. Strips of polyethylene plastic having a thickness in the range of 0.006 to 0.008 inch have been used with excellent results.

FIG. 2 shows an embodiment of the plow 123 in greater detail. Plow 123 is formed with a penetrating point or toe 206, a generally horizontally disposed shoe or film distributing housing 261 and a generally vertically disposed film feed housing 202 disposed with its widest sides 206A and 206B generally parallel with the direction of movement of the plow 123 through soil.

Film feed housing 202 is preferably streamlined for passing through the soil and comprises in the preferred embodiment two angled anterior surfaces 204A and 204B which meet to form a knife edge or leading edge 203 for cutting through the soil. The posterior portion of each of angled anterior walls 204A and 204B are continuous with a lateral wall 206A and 206B, respectively, of the film feed housing 202 and with an anterior wall 204C of film feed housing 202. The posterior portion of each of lateral walls 206A and 206B are continuous with posterior wall 207. In one embodiment, as shown, anterior wall 204C is generally parallel to posterior wall 207 and lateral walls 206A and 206B are generally parallel to one another so that the film feed housing 202 is preferably a hollow parallelepiped having the respective lower portions of the film feed housing walls mounted to the upper wall 233 of film distribution housing 261. Preferably, as shown, the anterior wall 204C and leading edge 203 form an acute angle with upper wall 233 of film distribution housing 261 to reduce resistance when the plow 123 is pulled through the soil. Preferably also the film feed housing 202 is set back somewhat from the toe 206 of film distribution housing 261 and a toe piece 205, having a concavely arcuate upper surface 205S, is mounted in the angle formed between the upper wall 233 and the leading edge 203 to facilitate entry and movement of the plow through the earth.

As indicated, in the preferred embodiment, the film feed housing is a hollow parallelepiped and the film feed housing walls form an opening or film inlet at their respective upper portions through which the film to be laid is passed.

According to the invention there is provided centering means adjacent the film inlet for centering the film in the film inlet as the film enters the film inlet and for preventing side-to-side movement of the film in the film inlet. By side-to-side movement is meant movement having a component normal to the broad surface of the film. The upper opening of film feed housing 202 provides a film inlet as indicated and is mostly covered in the illustrated embodiment by the centering guide 201. In the illustrated embodiment the centering guide 201 comprises two brackets 271A and 271B which can be formed from an appropriately sized piece of channel iron or by bending, which brackets each have a generally horizontal mounting portion and two downwardly extending gripping portions for releasably gripping the lateral walls 206A and 206B to hold the centering guide 201 in position. Two straps 272A and 272B are respectively mounted in centered, narrowly spaced apart relationship to the mounting portions of each of brackets 271A and 271B so that a narrow central opening 273 is formed through which film 119 is pulled as hereafter described. Although the centering guide 201 is described in terms of a preferred embodiment as required, it is clear that many other structures could perform a similar function and would be within the skill of the artisan. Such structures could include a closed upper end to the film feed housing having a narrow slit therein for passing film therethrough, juxtaposed or narrowly spaced apart rollers, a narrower hollow parallelepiped, and the like.

In the preferred embodiment film 119 is supplied in a folded sheet as shown in FIG. 2 and the two portions must be separated, guided, and evenly fed downward into the film distribution housing 261.

Accordingly in the illustrated embodiment, there is provided means in the film feed housing 202 for guiding the somewhat spread film 119 generally along fold 119F and for preventing side-to-side movement of the film in the film feed housing. Thus, for example, a guide strap 209 is provided to separate the folded portions of film 119 from one another and to provide a guide portion generally aligned with the fold 119F of the film 119 for guiding the film evenly downward through the film feed housing 202. In the illustrated embodiment, guide strap 209 comprises an upper portion generally parallel to the opening of film feed housing 202 and an anterior portion generally parallel to anterior wall 204C. The guide strap can be mounted to the posterior wall 207 by bolts 209B or otherwise mounted and can be further supported by support strap 208 which in the illustrated embodiment is bolted by bolt 212 to brackets 211 or otherwise mounted to the posterior wall 207 of film feed housing 202 and which strap 208 is also suitably mounted by bolting, welding, for example, to tab 210, or the like to the lower portion of the anterior portion of guide strap 209. In the illustrated embodiment guide strap 209 consists of a thin metal strip, centered and conforming to the configuration of film feed housing 202. The guide strap 209 divides the entering folded film 119, prevents side-to-side movement of the film within housing 202, and guides the fold 119F of the slightly spread film, thus helping to effect the even distribution or feeding of film 119 through the housing 202. Other guide means for separating and guiding the film are also within the scope of the invention, for example, suitably shaped sheet metal, and the like.

The film feed housing 202 also has an open lower end thereof and is attached to the upper wall 233 of the film distribution housing 261. Upper wall 233 has a corresponding opening therein (not shown) in feed through relationship with the open lower end of film feed housing 202 so that film can be fed from film feed housing 202 into film distribution housing 261.

Film distribution housing 261 comprises, as indicated, an upper wall 233 having a toe 206. Upper wall 233 has two anterior lateral portions 232 (only one can be seen) which each taper downward to a leading edge 231 (only one can be seen) to facilitate entry and movement through the soil.

Figure 3:
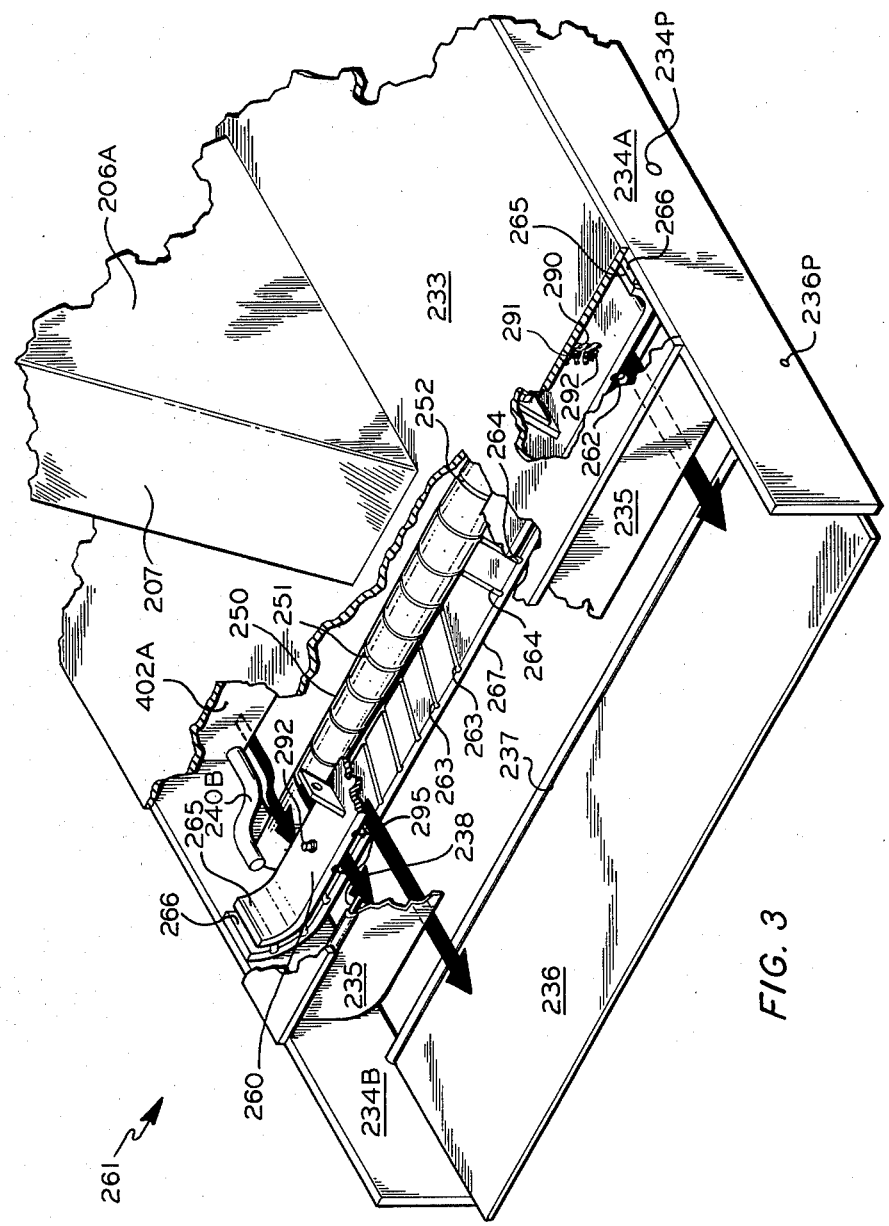
FIG. 3 illustrates in perspective a portion of the apparatus of FIG. 2 having portions thereof broken away to show structure.
Figure 4:
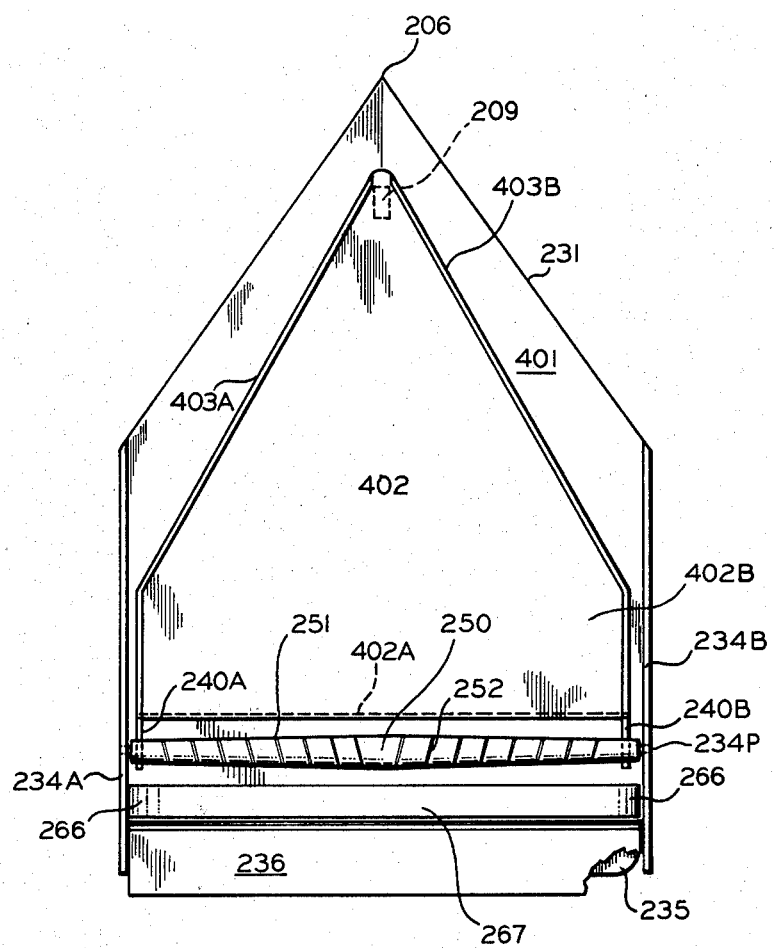
FIG. 4 illustrates a bottom view of the apparatus of FIG. 1.

Referring to FIG. 4, a reinforced sole plate 401 comprises means for providing a smoothed soil surface on which the film can be laid. A floor plate 402 is provided for further spreading the portions of folded film from one another and changing the direction of movement of the film so that a generally horizontally disposed strip of nonfolded film is produced. The floor plate 402 is recessed so that the lower surface of flow plate 402 is above the soil surface formed by sole plate 401 so that the film 119 (not shown in FIG. 4) can pass over the lower surface of floor plate 402 without undue drag developing. The lateral extremities of floor plate 402 are rounded so that a snag-free surface is provided over which the film (not shown) can pass. In the illustrated embodiment, the rounded surface is provided by welding steel rods 403A and 403B to the lateral extremities of floor plate 402. In the illustrated form, floor plate 402 comprises a symmetrical five-sided basal portion 402B having a generally triangular anterior portion continuous with a generally rectangular posterior portion. The generally rectangular posterior portion is turned upward to form a portion 402A (See also FIG. 3) transversely of the film distribution housing 261.

The sides of the film distribution housing 261 are formed by sidewalls 234A and 234B joined to upper plate 233 and sole plate 401 (See FIGS. 2, 3 and 4). As shown in FIGS. 2, 3 and 4, sidewalls 234A and 234B extend posteriorly beyond the end of upper wall 233 and sole plate 401 and provide means for attachment of apparatus hereinafter described.

As indicated, according to the invention there is provided means adjacent the film outlet of the plow for preventing earth from entering the film outlet of the plow while laying down earth on the film. As shown in FIGS. 2, 3, and 4, a transverse upper flap 235 is hinged (best seen in FIG. 3) at 238 to the posterior end of upper wall 233, so as to substantially prevent entry of loose sand or soil into the film distribution area of the plow while the flap 235 can also be readily raised for ease of access to the film aligning area. The upper flap 235 is also preferably shaped so as to conform to the desired conformation of the film being laid, in the illustrated embodiment, a shallow trough as described below in more detail.

As indicated, according to the invention there is also provided means adjacent the film outlet of the plow for supporting film while laying down earth thereon. As shown in FIGS. 2, 3, and 4, a transverse bearing plate or lower flap 236 is hinged at 237 and pivotably attached at respective ends to sidewalls 234A and 234B at pivot points 236P adjacent the posterior ends of said side walls. The hinged, preferably metal, bearing plate 236 is such that the pressure of the earth passing over the plow's upper walls 233 and upper plate 235 will impinge on the film passing over and supported by the upper surface of lower plate 236. The plate 236 supports the film while a more or less uniform weight of earth is placed thereon thereby preventing irregularities in the film from developing due to rocks, clods of earth, or irregular deposition of earth on the film. By this means, longitudinal wrinkles and other film irregularities are minimized.

The invention also comprises film alignment means for aligning the film as it passes through the film distribution housing. The film aligning means comprises singly or in suitable combination any of the following, best seen in FIG. 3 and FIG. 4; film guide rods 240A and 240B, centering roller 250, and film guide bars 260 and 267.

As indicated above, according to the invention there is provided means within the film distribution housing adjacent the film outlet for centering the film edge to edge, and for reducing edge-to-edge movement, and for smoothing in lateral directions the film being centered. By edge-to-edge movement is meant movement of the film having a component normal to the edge of the film.

Centering roller 250 is preferably a tapered steel roller. The roller 250 is tapered in a crown pattern being larger in the center and smaller at the ends. Preferably, the roller is machined with spiral grooves 251 and 252 running in opposite directions from adjacent the center to the ends of roller 250 so as to spread the film 119 as the roller turns. The crown, together with the spiral grooves, functions as a film centering device ahead of the film guide bars hereinafter described. As illustrated, the centering roller 250 is rotatably mounted to the side walls 234A and 234B of the film distribution housing 261 and can turn in any suitable bearing 234P, such as a sleeve or roller type. The roller may be made of other materials than steel, such as, for example, brass, aluminum, hardwood, durable plastic, and other suitable materials.

Centering roller 250 preferably has one or more helical grooves beginning adjacent the center of roller 250 on each half of the roller. As viewed from the film outlet end, i.e., posterior end, of the film distribution housing 261, shown in FIG. 3, the right hand portion of the roller 250 has one or more generally right-handed thread or clockwise helical grooves therein, viewed from the left hand end of roller 250, while the left-handed portion has one or more generally left-handed thread or counterclockwise helical grooves therein, viewed from the right hand end of roller 250. The grooves function to smooth the film laterally while the crown functions to assist in centering the film edge to edge as the film passes over the roller 250.

As best seen in FIG. 4, centering roller 250 is preferably mounted to side walls 234A and 234B adjacent the posterior end of floor plate 402. As best seen in FIG. 3, film passes (indicated by broad arows) beneath floor plate 402 (best seen in FIG. 4) having transverse wall 402A (See again FIG. 3) and then up and over centering roller 250.

As indicated, according to the invention, there is provided means adjacent the film outlet end of the plow and adjacent the centering means, for example, roller 250 and the like, and spaced anteriorly away from the film outlet end of the plow relative to guide bars 260 and 267 described below, for preventing, according to one embodiment of the invention, the curved lateral edges of the film from overlapping a horizontal portion of the film.

Thus, for example, as in the illustrated embodiment, guide rods 240A and 240B can be installed laterally adjacent the posterior end of floor plate 402 and adjacent the film exit. In the illustrated embodiment the guide rods 240A and 240B are butt welded to the floor plate rods 403A and 403B (shown in FIG. 4). However, other methods of attachment are also possible. Each of the guide rods 240A and 240B is curved to fit over a respective lateral end of tapered centering roller 250 so as to prevent overlapping of film edges as the film is fed between the guide bars 260 and 267.

The orientation of guide rods is best seen in FIG. 3 and FIG. 4. As seen in FIG. 3, the guide bar 240B is in close narrowly spaced apart relationship to centering roller 250 and terminates adjacent the curved lateral portions 265 and 266 of guide bars 260 and 267, described in more detail below. The curved lateral portions 265 and 266 impart a curvature to the sides of the film passing through the guide bars so that the film is shaped in a cross-sectional shallow trough conformation to enhance moisture retention. The curvature imparted to the film tends however to cause overlapping of the film edges in the film distribution housing and the guide rods 240A and 240B overcome this tendency and prevent such overlapping.

As indicated above, according to the invention there is provided means adjacent the film outlet and spaced toward the film outlet from the centering means, for example, roller 250, for shaping the film to be laid according to a desired conformation and for stretching the film in lateral directions. Thus, film after being passed over centering roller 250 is passed between guide bars 260 and 267. The film guide bars 260 and 267 comprise an upper film guide bar 260 and a lower film guide bar 267. The film guide bars are formed in the desired configuration for the film placement pattern, in the illustrated embodiment, cross-sectionally a shallow trough with upturned side edges, although other configurations are also possible, for example, flat, undulating configurations and the like. Thus, upper guide bar 260 has upturned lateral ends 265 and lower guide bar 267 has upturned lateral ends 266. These are functional for curving the lateral edges of the film upward. The lower surface of upper guide bar 260 and the upper surface of lower guide bar 267 preferably have grooves or a raised herringbone pattern slanting in opposite directions from adjacent the center of each guide bar. Preferably the upper guide bar 260 has a first plurality of grooves 295 diverging to the left and a second plurality of grooves 262 diverging to the right of center. Similarly, the lower guide bar 267 has a first plurality of grooves 263 diverging to the left, and a second plurality of grooves 264 diverging to the right, of center, forming imaginary apexes anterior of the guide bars. Preferably the grooves diverge from the center toward the posterior sides of the plow and act to stretch or iron out film passing between the film guide bars by the opposing stress of the herringbone pattern. Thus, preferably, the lower surface of film guide bar 260 substantially conforms to the upper surface of film guide bar 267, although as shown in FIG. 3, it is not necessary that the grooves of the upper film guide bar 260 correspond with the grooves of the lower film guide bar 267. The upper guide bar 260 and lower guide bar 267 have tension springs 290 positioned, for example, by stud 291 on the lower surface of the upper wall 233 of film distribution housing 261 and by stud 292 on the upper surface of upper guide bar 260.

The spacing springs 290 on upper film guide bar 260 permit variable bearing pressure against the lower guide bar 267, which is preferably mounted to side walls 234A and 234B of film distribution housing 261, so that the film passing therebetween is smoothed.

As indicated by the above detailed description, film 119 is passed from a spool 118 (See FIG. 1) of film through a centering guide 201. In the illustrated embodiment of FIG. 2, the film 119 is folded having a fold 119F. After passing through the centering guide, the two portions of the film 119 are somewhat separated from one another by guide strap 209 which also functions to generally guide the film 119 downward through the film feed distribution housing along the fold 119F of the film 119. The film 119 passes into the film distribution housing 261 and the lateral portions of the film 119 joined by fold 119F are further spread apart by passing over floor plate 402, shown in FIG. 4, and at the same time the film is turned so that the film is generally horizontal and more or less parallel to the subsoil surface prepared for the film. After passing over the posterior end of floor plate 402 having transverse wall 402A (see now FIG. 3) the film is fed beneath guide rods 240A and 240B and over roller 250, thence between guide bars 260 and 267 which form and shape the film in a desired cross-sectional configuration. The film then passes out of the film distribution housing 261 under hinged upper plate 235 and is supported on hinged lower plate 236 while earth is laid down on the film. The film with earth laid down thereon is then itself laid on the subsoil surface prepared for it by the plow.

Further in accordance with the invention is means for releasably retaining an end of film as the plow enters the ground and for releasing the end of film after a portion of the strip of film is laid under the ground. The means, in the illustrated embodiment, comprises a film starting bar system 213 (FIG. 2 and FIG. 5) which can be mounted in a bracket 216 on posterior wall 207 of film feed housing 202. The film starting bar system 213 provides means for starting film in the earth in an easy and efficient manner without preliminarily anchoring the film in some way to the ground, as for example, by spikes, rocks, or a man standing on the film.

The starting bar system 213 comprises a first bar 214, in the illustrated embodiment formed from a piece of channel iron, a second bar 215, in the illustrated embodiment formed from a piece of angle iron, a tab 217 (FIG. 5) mounted to the first bar 214 for supporting the starting bar system 213 in bracket 216, and fastening means, comprising in the illustrated embodiment as shown in FIG. 5 and FIG. 6, bolt 218, nut 219, and tension spacing springs 220 so mounted that tension spacing springs 220 cause bars 214 and 215 to releasably grip an end of film passed therebetween.

The film starting bar system is preferably placed horizontal to the base of the plow. The film is placed between the tension loaded bars 214 and 215. As the plow enters the ground, the earth passing over the plow engages the film, pulling it from between bars 214 and 215 and anchoring it in the ground. The film starting bar system thus is functional for releasably retaining the film prior to and as the plow is started into the ground and for releasing the film when earth is laid on at least a portion of the film and the plow moves away from the point of entry of the film into the soil.

That which is claimed is:

1. Apparatus for laying a strip of film under the surface of the soil comprising:
   a hollow plow having a film inlet above the soil surface and a film outlet adapted to be below the soil surface when the plow is moving through the soil;
   a source of film;
   means for passing film from the source of film into the film inlet, through the hollow plow, and out the film outlet under the soil surface while the plow is moving through the soil; and
   first means adjacent the film outlet of the hollow plow for supporting the film under the soil after passing the film out of the film outlet under the soil.

2. Apparatus as in claim 1 wherein:
   the first means comprises a first hinged plate mounted to the plow adjacent the film outlet so that the plate supports the film under the soil after passing the film out of the film outlet under the soil.

3. Apparatus as in claim 1 further comprising:
   second means adjacent the film outlet of the hollow plow for preventing soil from entering the film outlet of the hollow plow passing the film out of the film outlet under the soil.

4. Apparatus as in claim 3 wherein:
   the first means comprises a first hinged plate mounted to the plow adjacent the film outlet so that the plate supports the film under the soil after passing the film out of the film outlet under the soil; and
   the second means comprises a second hinged plate mounted to the plow adjacent the film outlet so that soil is prevented from entering the film outlet of the plow while film is being laid.

5. Apparatus for laying a strip of film under the surface of the ground comprising:
   a hollow plow having a film inlet above the ground surface and a film outlet adapted to be below the ground surface as the plow is moving through the ground;
   a source of film;
   means for passing film from the source of film into the film inlet, through the hollow plow, and out the film outlet, said means comprising centering means associated with the plow adjacent the film inlet for centering the film in the film inlet and for preventing side-to-side movement of the film as the film enters the hollow plow, said centering means comprising a first bar and a second bar, the second bar being narrowly spaced from the first bar to form a narrow passage which is centered in the film inlet means.

6. Apparatus for laying a strip of film under the surface of the ground comprising:
   a plow having a film inlet, a film feed housing in film feed communication with the film inlet, a film distribution housing in film feed communication with the film feed housing, said film distribution housing further having a film outlet;
   first means connected in film feed communication with the film feed housing for centering the film edge to edge and for smoothing in lateral directions the film being centered;
   second means for shaping the film to be laid according to a desired confirmation and for stretching the film in lateral directions, said second means being in film feed communication with the first means, wherein the second means comprises means for curving lateral edges of the film upward and for stretching the film horizontally so that the film is conformed to a cross sectional trough conformation having a central generally horizontal portion and upwardly curved lateral edges; and
   third means, adjacent and between the first means and the second means, for preventing the curved lateral edges of the film from overlapping the central generally horizontal portion of the film.

7. Apparatus as in claim 6 wherein:
   the first means comprises a roller tapered in a crown pattern being larger at the middle and smaller at ends thereof, the right-hand portion of the roller when viewed from the film outlet having a groove forming a right-handed helix thereon and the left-hand portion of the roller having a groove forming a left-handed helix thereon;
   the second means comprises a first bar having a first bar surface and a second bar having a second bar surface substantially conforming to the first bar surface and the second bar surface having grooves therein for stretching the film.

8. Apparatus for laying a strip of film under the surface of the ground comprising:
   a source of folded film, said film having a first portion, a second portion, and a fold joining the first portion and the second portion;
   a plow having a film inlet, a film feed housing in film feed communication with the film inlet, a film distribution housing in film feed communication with the film feed housing, said film distribution housing further having a film outlet;
   first means mounted in the film feed housing adjacent the film inlet for spreading the first portion from the second portion of the folded film;
   second means mounted in the film feed housing and connected to said first means and extending therefrom toward the film distribution housing for guiding the fold of the spread film and for preventing side-to-side movement of the film in the film feed housing;
   third means in the film distribution housing for further spreading the first portion from the second portion of the folded film to produce a generally horizontally disposed strip of nonfolded film; and
   fourth means for passing the generally horizontally disposed strip of film through the film outlet of the film distribution housing.

9. Apparatus as in claim 8 further comprising:
   fifth means for centering the film in the film feed inlet to prevent side-to-side movement of the film as the film enters the film feed housing.

10. Apparatus for laying a strip of film under the surface of the ground comprising:

a plow having a film inlet above the ground surface and a film outlet below the ground surface when the plow is moving through the ground; and film starting means carried by the plow for releasably retaining an end of film as the plow enters into the ground and for releasing the end of film after a portion of the strip of film is laid under the surface of the ground.

11. Apparatus as in claim 10 wherein the film starting means comprises:

a first bar;

a second bar for bearing against the first bar; and means resiliently connecting the first bar and the second bar so that pressure is developed between the first bar and the second bar to releasably retain an end of film inserted therebetween.

12. Apparatus for laying a generally horizontally disposed strip of film under the surface of the earth comprising:

a spool of folded film, said folded film having a first portion, a second portion joined to and overlapping the first portion, and a fold at the junction of the first portion and the second portion;

a hollow plow comprising a film feed housing having a film inlet, a film distribution housing in film feed communication in the film feed housing, the film distribution housing having a film outlet;

first means adjacent the film inlet for centering a strip of folded film passed from the spool to prevent side-to-side movement of the film;

second means adjacent the first means for spreading the first portion from the second portion of the folded film;

third means adjacent the second means for guiding the fold of the spread film to prevent side-to-side movement of the film;

fourth means for passing the guided film into the film distribution housing;

fifth means for further spreading the first portion from the second portion of the film to produce a generally horizontally disposed nonfolded strip of film;

sixth means for centering the thus spread film to prevent edge-to-edge movement of the film and for smoothing the film in lateral directions, said sixth means comprising a roller journaled in said film distribution housing and tapered in a crown pattern and being larger at the middle and smaller at the ends thereof;

seventh means for curving the lateral edges of the centered film and for stretching the thus centered film laterally;

eighth means for preventing the curved lateral edges of the film from overlapping noncurved portions of the film; and ninth means adjacent the film outlet for distributing the film with curved lateral edges from the film outlet under the surface of the earth so that wrinkling of the film is prevented and so that entry of earth into the film feed housing is reduced.

13. A method of laying a strip of film under the surface of the ground comprising:

passing the film through a hollow plow;

centering the film during passage through the hollow plow by passing the film in rolling contact over a roller tapered in a crown pattern and being larger at the middle and smaller at the ends thereof;

supporting the film under the surface of the ground;

laying down earth on the supported film; and laying the film with earth laid down thereon on an underground surface.

14. Method as in claim 13 further comprising:

preventing earth from entering the hollow plow while laying down earth on the supported film.

15. A method of laying a strip under the ground comprising:

centering a strip of film to prevent side-to-side movement of the film in a film inlet of a hollow plow, said hollow plow having a film inlet above the surface of the ground and a film outlet adapted to be below the surface of the ground while the plow is moving through the ground;

passing the strip of film from the film inlet in rolling contact over a roller tapered in a crown pattern and being larger at the middle and smaller at the ends thereof to the film outlet and through the film outlet; and, laying the thus passed film under the ground.

16. A method of laying a strip of film under the surface of the ground comprising:

passing film from above ground to below ground through a hollow plow;

centering the passing film to prevent edge-to-edge movement of the film in the plow and smoothing the film in lateral directions by directing the passing film in rolling contact over a roller tapered in a crown pattern and being larger at the middle and smaller at the ends thereof;

shaping the centered film in a desired conformation and stretching the centered film in lateral direction; and laying the thus passed film under the surface of the ground.

17. Method as in claim 16 wherein the step of shaping the centered film in a desired conformation and stretching the centered film in lateral directions comprises curving the lateral edges of the film upward and stretching the film horizontally so that the film is conformed to a trough conformation having a central generally horizontal portion and upwardly curved lateral edge, and further comprising:

preventing the upwardly curved lateral edges of the film from overlapping the central generally horizontal portion of the film.

18. A method of laying a strip of film under the surface of the ground comprising:

passing a strip of film from above ground to below ground through a hollow plow moving into and through the ground;

releasably retaining an end of the strip of film in connection to the plow as the plow moves into the ground; and releasing the releasably retained end of the strip of film after a portion of the strip of film is passed through the plow and is laid under the surface of the ground.

19. A method of laying a generally horizontally disposed strip of film under the surface of the ground comprising in combination:

unrolling a folded film from a spool of folded film having a first portion, a second portion joined to and overlapping the first portion, and a fold at the junction at the first and second portions;

centering the unrolled folded film to prevent side-to-side movement of the film in a film inlet of a film feed housing of a hollow plow comprising a film feed housing and a film distribution housing in film feed communication with the film feed housing;

spreading the first portion from the second portion;

guiding the fold of the spread film to prevent side-to-side movement of the film within the film feed housing;

passing the guided film from the film feed housing into the film distribution housing;

further spreading the first portion from the second portion of the film to produce a generally horizontally disposed nonfolded strip of film;

centering the thus further spread film;

curving the lateral edges of the thus centered film and stretching the thus centered film laterally;

preventing the curved lateral edges of the curved film from overlapping noncurved portions of the film;

passing the film with curved lateral edges from the film feed housing; and supporting the film thus passed from the film feed housing under the ground so that wrinkling of the film by the ground thereabove is prevented and so that entry of earth into the film feed housing is substantially prevented.

20. Apparatus for laying a strip of film under the surface of the ground comprising:

a plow having a film inlet, a film feed housing in film feed communication with the film inlet, a film distribution housing in film feed communication with the film feed housing, said film distribution housing further having a film outlet;

first means connected in film feed communication with the film feed housing for centering the film edge-to-edge and for smoothing in lateral directions the film being centered, said first means comprising a roller tapered in a crown pattern being larger at the middle and smaller at the ends thereof, the right-hand portion of the roller when viewed from the film outlet having a groove forming a right-handed helix thereon and the left-hand portion of the roller having a groove forming a left-handed helix thereon;

second means for shaping the film to be laid according to a desired conformation and for stretching the film in lateral directions, said second means being in film feed communication with the first means, said second means comprising means for curving lateral edges of the film upward and for stretching the film horizontally so that the film is conformed to a cross sectional trough conformation having a central generally horizontal portion and upwardly curved lateral edges, and said second means further comprising a first bar having a first bar surface and a second bar having a second bar surface substantially conforming to the first bar surface and the second bar surface having grooves therein for stretching the film; and third means, adjacent and between the first means and the second means, for preventing the curved lateral edges of the film from overlapping the central generally horizontal portion of the film.

21. Apparatus for laying a strip of film under the surface of the ground comprising:

a plow having a film inlet, a film feed housing in film feed communication with the film feed inlet, a film distribution housing in film feed communication with the film feed housing, said film distribution housing further having a film outlet;

first means connected in film feed communication with the film feed housing for centering the film edge-to-edge and for smoothing in lateral directions the film being centered, said first means comprising a roller tapered in a crown pattern being larger at the middle and smaller at the ends thereof, the right-hand portion of the roller when viewed from the film outlet having a groove forming a right-handed helix thereon and the left-hand portion of the roller having a groove forming a left-handed helix thereon; and second means for shaping the film to be laid according to a desired conformation and for stretching the film in lateral directions, said second means being in film feed communication with the first means, said second means comprising means for curving lateral edges of the film upward and for stretching the film horizontally so that the film is conformed to a cross sectional trough configuration having a central generally horizontal portion and upwardly curved lateral edges, and said second means further comprising a first bar having a first bar surface and a second bar having a second bar surface substantially conforming to the first bar surface and the second bar surface having grooves therein for stretching the film.

22. Apparatus for laying a strip of film under the surface of the ground comprising:

a plow having a film inlet above the ground surface and a film outlet below the ground surface when the plow is moving through the ground; and film starting means associated with the plow for releasably retaining an end of the strip of film as the plow enters into the ground and for releasing the end of the strip of film after a portion of the strip of film is laid under the surface of the ground, said film starting means comprising:

first bar means;

second bar means for bearing against the first bar means; and means resiliently connecting the first bar means and the second bar means so that pressure is developed between the first bar means and the second bar means to releasably retain an end of a strip of film inserted therebetween.

* * * * *